W. J. POWELL.
Cotton Harvester.

No. 196,386. Patented Oct. 23, 1877.

WITNESSES:
Chas. Nida
Edgar Tate

INVENTOR:
W. J. Powell
BY
ATTORNEYS.

N. PETERS, PHOTO-LITHOGRAPHER, WASHINGTON, D. C.

W. J. POWELL.
Cotton Harvester.
No. 196,386.        Patented Oct. 23, 1877.
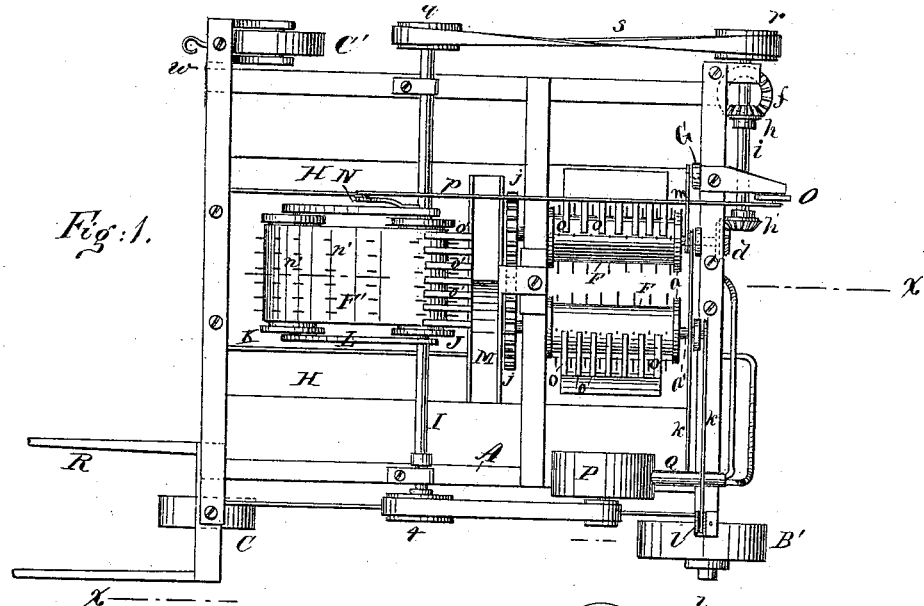
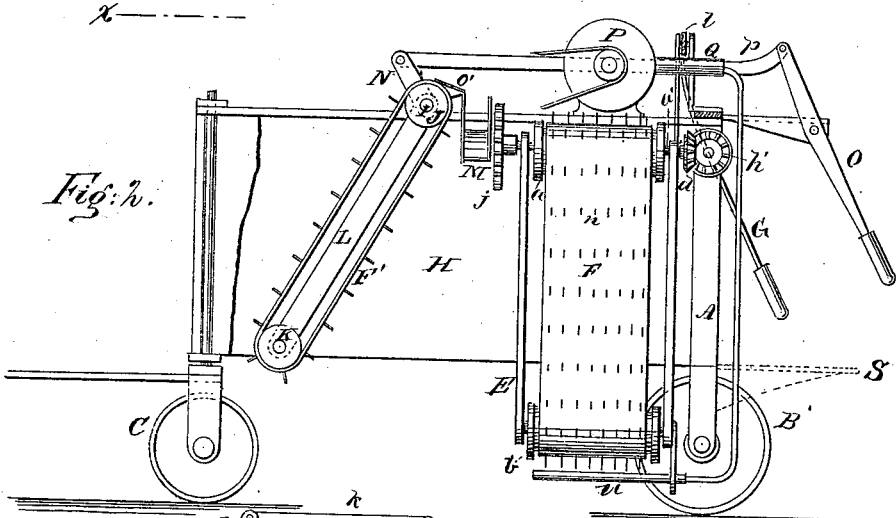
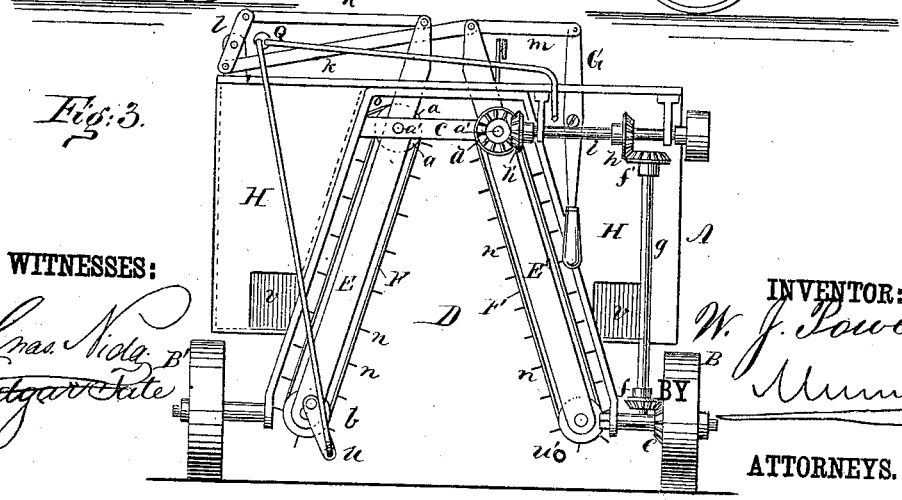
WITNESSES:
INVENTOR:
W. J. Powell.
BY
ATTORNEYS.

UNITED STATES PATENT OFFICE.

WILLIAM J. POWELL, OF MARSHFIELD, MASSACHUSETTS.

IMPROVEMENT IN COTTON-HARVESTERS.

Specification forming part of Letters Patent No. 196,386, dated October 23, 1877; application filed September 1, 1877.

*To all whom it may concern:*

Figure 1:
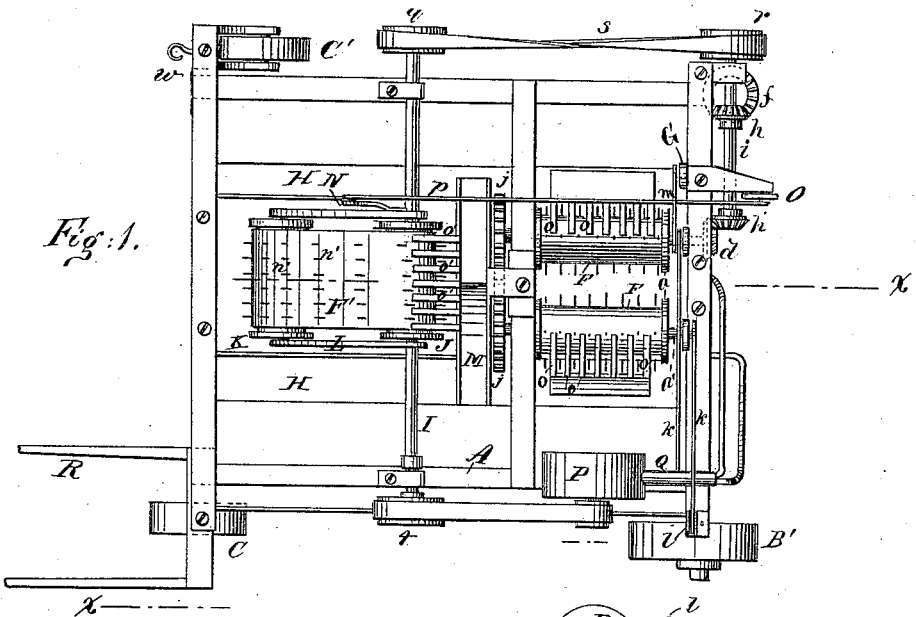
Figure 2:
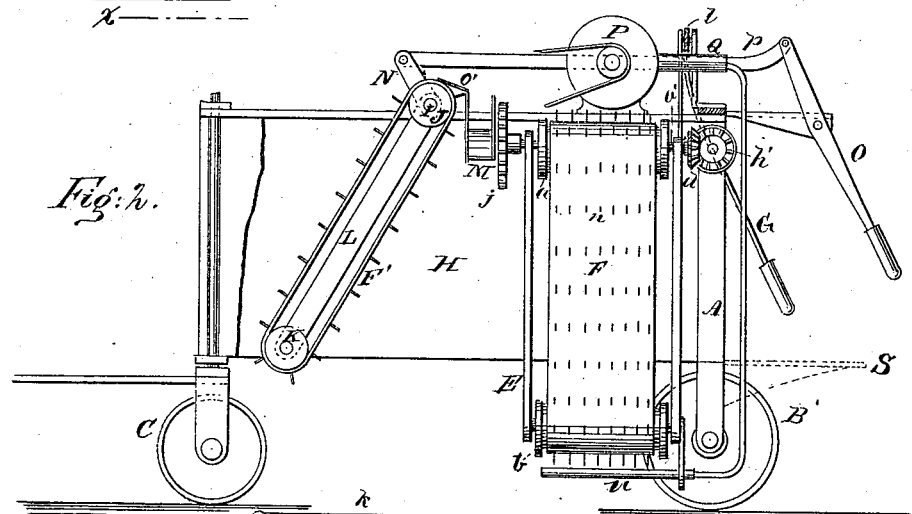
Figure 3:
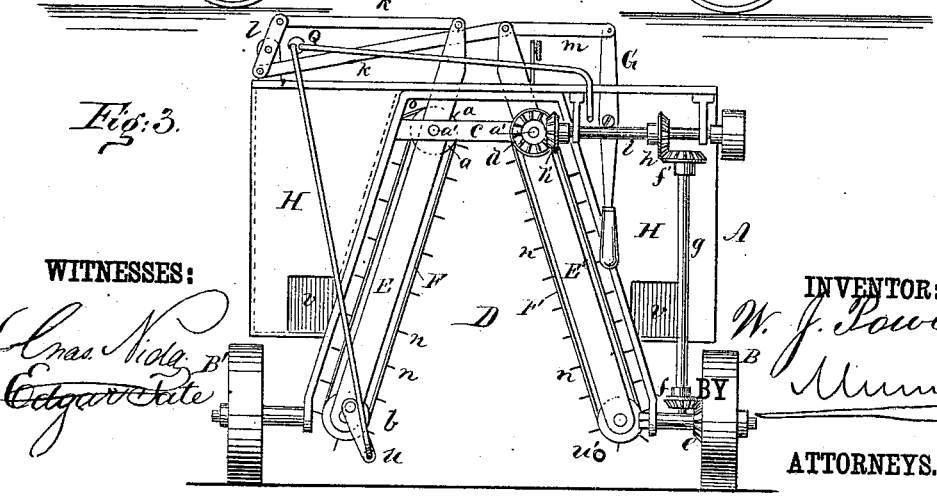

Be it known that I, WILLIAM J. POWELL, of Marshfield, in the county of Plymouth and State of Massachusetts, have invented a new and Improved Cotton-Harvester, of which the following is a specification:

Figure 1 is a plan view. Fig. 2 is a side elevation, partly in section, on line $x\,x$ in Fig. 1. Fig. 3 is a rear elevation.

Similar letters of reference indicate corresponding parts.

The invention will first be described in connection with the drawing, and then pointed out in the claims.

Referring to the drawing, A is the frame of the machine, which is mounted on wheels B B' and C C'. There is an opening, D, through the frame A, which is narrow at the top and wide at the bottom. In this opening, at the rear of the machine, there are two frames, E E', which contain endless aprons F, which run over drums $a$ journaled in the top of the frames, and over drums $b$ journaled at the bottom of the frames. The shafts of the drums $a$ extend through the frames E E' and through cross-bars $c$, secured to the frame A, forming pivots, upon which said frames swing. To one of the shafts, $a'$, a miter-wheel, $d$, is attached, which receives motion from a miter-wheel, $e$, on the hub of the wheel B, through wheels $f$ $f'$ on the vertical shaft $g$ and wheels $h\,h'$ on the horizontal shaft $i$. Motion is transmitted from one of the shafts $a$ to the other by means of spur-wheels $j$, secured to their forward ends. The bars forming the rear side of the frames E E' extend above the shafts $a'$, for receiving rods $k$, by which they are connected with opposite ends of a lever, $l$, having two equal arms. By means of this device the movement of one of the frames creates a similar motion in the other, but in the opposite direction.

A lever, G, is pivoted to one of the cotton-receptacles, and is connected at its upper end with the projecting end of the side piece of the frame E' by a link, $m$.

At the sides of the frame A there are boxes H for receiving cotton carried up by the wire teeth $n$ of the endless apron F, fingers $o$ being attached to the boxes, and resting upon the apron, where it passes over the upper drum, for the purpose of removing the cotton from the teeth carried by the aprons.

A shaft, I, is journaled in the top of the frame A, in front of the aprons F, at right angles to the shafts $a'$, and to it is secured a drum, J, which carries an endless apron, F', the lower end of which is supported by a drum, K, which is journaled in a frame, L, suspended from the shaft I.

The apron is provided with teeth $n'$, and a chute, M, extends from one box, H, to the other, and is provided with fingers $o'$, which rest upon the apron, and remove the cotton from the teeth carried by the apron, and delivers it to the chute M, which carries it to the boxes H.

An arm, N, is attached to the frame L, and is connected by a rod, $p$, with a lever, O, at the rear of the machine.

The shaft I is provided with a pulley, $q$, that takes motion from a pulley, $r$, on the shaft $i$, through a belt, $s$. It is also provided with a pulley, $t$, on the opposite end, for driving a blower, P, mounted on the top of the frame A.

The pipe Q that leads from the blower is divided, one branch extending downward to a perforated pipe, $u$, carried by the frame E, and the other communicating with a perforated pipe, $u'$, carried by the frame E'. The pipes $u\,u'$ are placed just below the drums $b$, and are arranged to direct jets of air upward along the inner surface of the aprons.

By means of this device any particles of cotton that may be detached by the action of the machine are carried upward until they are caught by the teeth of the aprons, and likewise blow the sand out.

At the ends of the boxes H there are openings $v$, for the discharge of cotton.

C' is a caster-wheel which supports one of the forward corners of the machine, and C is a wheel which supports the opposite corner. The support of the wheel C is pivoted, and to it a pair of shafts, R, are attached. To these shafts and to a hook, $w$, horses are hitched.

A platform, S, is attached to the rear of the machine, for supporting the person that operates the machine.

As the machine is drawn forward over a row of cotton-plants the aprons are rotated, and the wire teeth remove the ripe cotton and deliver it to the boxes H. The aprons F operate upon the sides of the cotton-plant, and the apron F' upon the top. By moving the levers G O the aprons may be adjusted to the row of plants, as circumstances may require. The machine is guided entirely by the horse in the shafts R.

I do not limit myself to the particular form or arrangement of parts herein shown and described, as they may be varied without departing from my invention.

Having thus described my invention, what I claim as new, and desire to secure by Letters Patent, is—

1. The combination of the lever $l$, connecting-rods $k$, and frames E E', substantially as shown and described.

2. The blower $p$, having perforated discharge-nozzles $u$ $u'$, in combination with the endless aprons F, as and for the purpose specified.

3. The combination of the lever G and link $m$ with the frames E E', substantially as shown and described.

4. The lever O and rod $p$, in combination with the frame L, having the arm N, and carrying the apron F', substantially as shown and described.

WILLIAM JAMES POWELL.

Witnesses:
H. A. OAKMAN,
LUCINDA H. OAKMAN.